United States Patent [19]

Styczinski

[11] Patent Number: 5,442,752
[45] Date of Patent: Aug. 15, 1995

[54] DATA STORAGE METHOD FOR DASD ARRAYS USING STRIPING BASED ON FILE LENGTH

[75] Inventor: David A. Styczinski, Rochester, Minn.

[73] Assignee: International Business Machines Corporation, Armonk, N.Y.

[21] Appl. No.: 824,962

[22] Filed: Jan. 24, 1992

[51] Int. Cl.⁶ .............................................. G06F 12/02
[52] U.S. Cl. .............................. 395/404; 364/DIG. 1; 364/248.1; 364/DIG. 2; 364/961.3; 364/962; 364/963; 395/441
[58] Field of Search ................................ 395/275, 425

[56] References Cited

U.S. PATENT DOCUMENTS

| 4,989,206 | 1/1991 | Dunphy et al. | 371/10.1 |
| 5,128,810 | 7/1992 | Halford | 360/39 |
| 5,210,860 | 5/1993 | Pfeffer et al. | 395/575 |
| 5,239,640 | 8/1993 | Froemke et al. | 395/425 |
| 5,257,362 | 10/1993 | Menon | 395/425 |
| 5,263,145 | 11/1993 | Brady et al. | 395/425 |

FOREIGN PATENT DOCUMENTS 0369707  5/1990  European Pat. Off. .

OTHER PUBLICATIONS

Reddy et al., "An Evaluation of Multiple-Disk I/O Systems" IEEE Trans. on Computers, Dec. 1989 pp. 1680–1690.
Patterson et al., "Introduction to Redundant Arrays of Inexpensive Disks (RAID)", IEEE 1989 pp. 112–117.
Weikum et al. "Dynamic File Allocation in Disk Arrays" ACM SIGMOD '91, May 29–31, 1991, pp. 406–415.
Paterson et al, "A Case for Redundant Arrays of Inexpensive Disks (RAID)" Jun. 1–3, 1988.
Bealkowski: "Logical Addressing Extension for Multiple Disk Drive Units" IBM T.D.B. 32/8A Jan. '90.
UltraStor Corporation brochure, ULTRA 124F Disk Array Controller.

Primary Examiner—Thomas C. Lee
Assistant Examiner—D. Dinh
Attorney, Agent, or Firm—Philip M. Kolehmainen; Roy W. Truelson; Pryor A. Garnett

[57] ABSTRACT

In a data storage method for checksum DASD arrays, files are classified by length and/or other characteristic. Each relatively shorter file is written to an address or contiguous addresses typically on a single DASD of the array. The checksum stored on a checksum DASD is updated by reading the existing checksum, XORing that with the new data and writing the new checksum. Each relatively longer file is subdivided into portions all of the same size, and the number of equal portions is equal to the number of data DASDs where the file is to be written. The portions are interleaved in a stripe of addresses on the data DASDs, and the checksum of the portions is written to the checksum DASD. The characteristic transition length is dynamically varied in order that each interleaved file is provided with contiguous addresses matched to the file size.

13 Claims, 4 Drawing Sheets

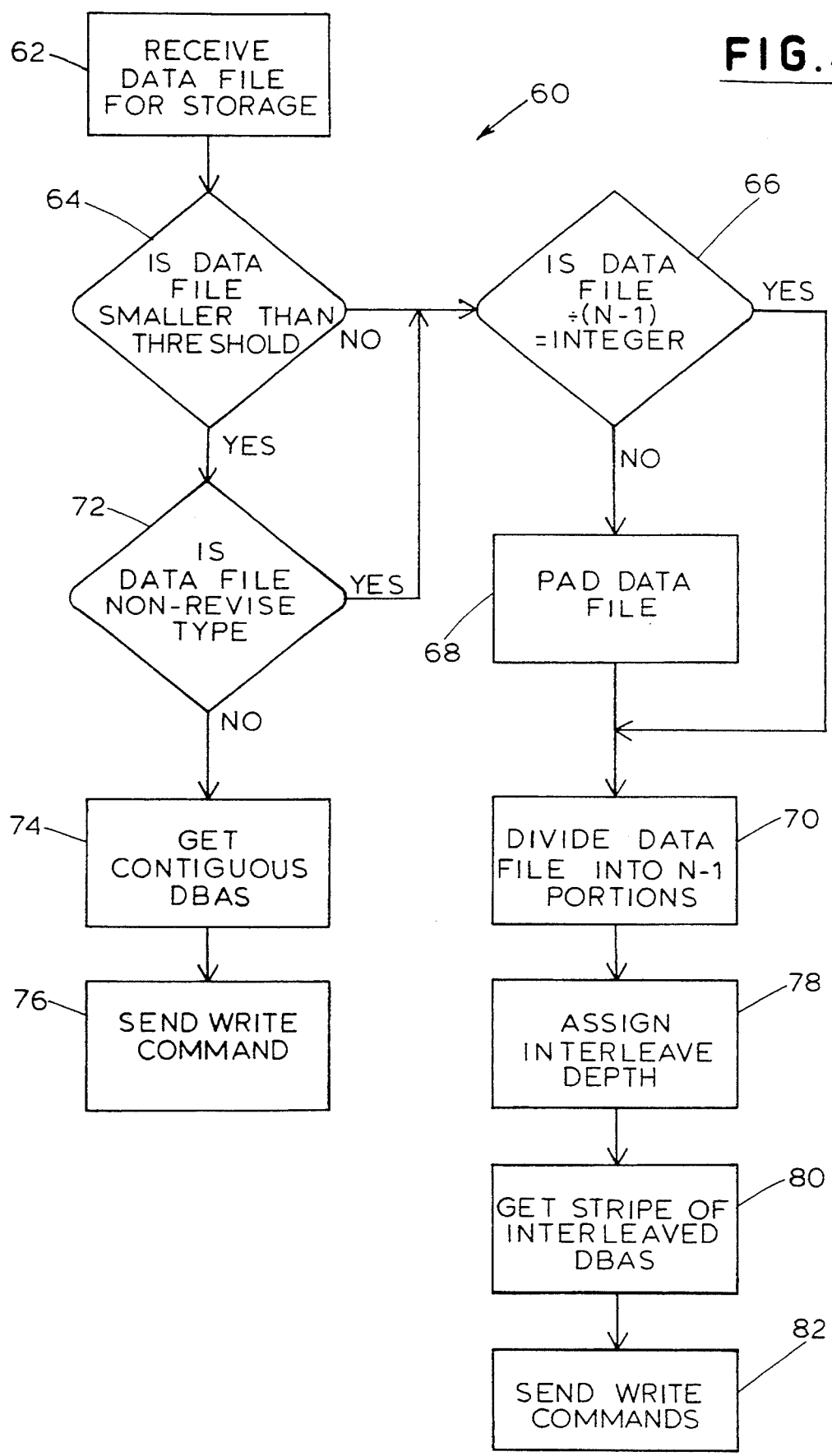

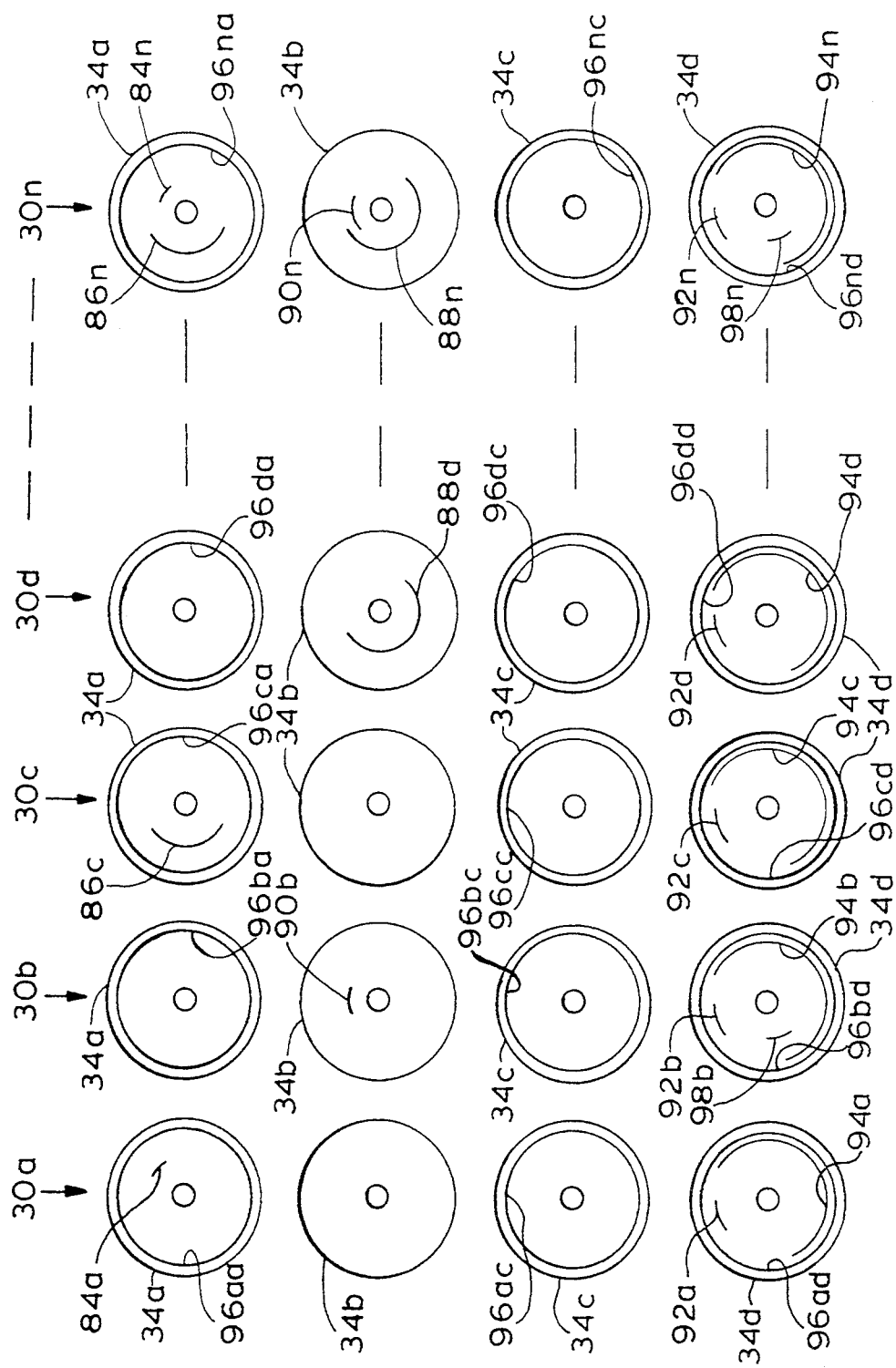

DATA STORAGE METHOD FOR DASD ARRAYS USING STRIPING BASED ON FILE LENGTH

FIELD OF THE INVENTION

This invention relates to an improved method and apparatus for storing data files on DASDs of an array of DASDs.

DESCRIPTION OF THE PRIOR ART

Direct access storage devices (DASDs) are used to store data for host data processing systems. One often used type of DASD is a magnetic disk unit including a number of disks or platters having surfaces with magnetic active material onto which data is written and from which data is read by magnetic read/write heads. In other types of DASDs, optical or other data storage media may be employed.

In a magnetic disk unit, the disks are formatted to define sectors and tracks upon the disk surfaces. Tracks are usually circular regions coaxial with the disk axis where data may be written, and sectors are parts of the tracks capable of storing a predetermined quantity of data written to the disk. Axially aligned tracks on the disks of a DASD are referred to as cylinders. The sectors of a DASD where blocks of data are stored have unique physical data block addresses (DBA), which may be expressed in cylinder, head, record (CHR) notation, relative block address (RBA) notation or in some other way. The disks of the DASD spin in unison around a common axis, and the read/write heads, usually one for each surface, are moved radially in unison across the disk surfaces. When data is read from or written to a physical DBA, the heads are moved into alignment with the cylinder containing the track in which the DBA is found, and the data transfer takes place as the sector or sectors of the DBA spin under the head.

Important considerations in the design and use of DASDs are capacity, speed of data transfer and reliability. For reasons including those discussed in Patterson et al., "A Case for Redundant Arrays of Inexpensive Disks (RAID)", ACM SIGMOD Conference, Chicago, Ill., Jun. 1-3, 1980, increasing performance levels attained by central processing units (CPUs) and system memory in data processing systems result in the need for larger and faster data storage systems. To achieve these goals of capacity and speed, it has been proposed to use arrays containing a number of DASDs rather than a single very large and expensive DASD for data storage.

To assure reliability, DASD arrays typically employ redundant data storage so that data can be reconstructed if lost due to disk failure or other cause. A common arrangement is to calculate exclusive or (XOR) checksum or parity information when data is written to one or more DASDs, and to write the checksum data in a different place. For example, an array may include a number of data DASDs and an additional DASD used exclusively to store checksum data. Typically, each sector or data block address of the checksum DASD contains the checksums of all of the data bits in the same sectors or data block addresses of the data DASDs in the array. If data in one DASD is lost, it can be reconstructed using the remaining data and the checksum data. In a similar approach described by Patterson et al., in order to avoid a bottleneck at the checksum DASD, the checksum data may be spread in a diagonal stripe across all of the DASDs rather than being concentrated onto one DASD.

Different systems have been employed for addressing and using the data DASDs of an array. In one approach, the host system directly accesses the physical addresses of each DASD in the array, and writes files of data directly to sequential DBAs of the DASDs of the array. In this approach, except for special cases where a file may span two DASDs, each file is stored on a single DASD.

When new data is written to a DBA on a data DASD in a system wherein the DASDs are individually accessed, one disk read operation and two disk write operations are performed in order to read the old checksum data, calculate the new checksum data and write both the new data and the new checksum data. An example of a system of this type is disclosed in U.S. patent application Ser. No. 648,944 filed Feb. 1, 1991, incorporated herein by reference. This technique is highly efficient, particularly for data processing systems in which the data files to be stored are relatively small and for systems in which files are often read, modified and again stored. This efficiency results from the fact that the heads can be used simultaneously to read and write different data files to different disk surfaces. But for larger files and files that are typically read but not modified, the need to transfer large quantities of data sequentially can result in undesirable inefficiency.

In another system, the physical addresses of all of the individual data DASDs are combined into one logical address space, for example by mapping the physical addresses of several data DASDs to a single logical address space appearing to the host system as a single large logical DASD. Such a mapping technique is described in Bealkowski, "Logical Addressing Extension for Multiple Disk Drive Units", IBM Technical Disclosure Bulletin, Vol. 32 No. 8A, January, 1990.

When single logical address space mapping is used for a DASD array, usually sequential small units such as bits or bytes of data are mapped to the corresponding locations of successive data DASDs in the array. When a file is written to the array, the data is interleaved across different disks and written in stripes simultaneously onto the same physical addresses in all of the data DASDs of the array. Because of the large bandwidth resulting from streaming the data of the file in parallel channels to different heads, data in large files can be transferred quickly. Further efficiency results from the fact that the checksum is calculated directly from the new data being transferred and there is no need to read the existing checksum data in order to update the checksum.

Data interleaving or striping onto different disks is not efficient for small data files. Because the heads in all of the data DASDs of the array read and write simultaneously, each data transfer occupies all of the heads of the data DASDs. The size of the data units mapped sequentially to successive data DASDs can be selected and fixed for a given array in an attempt to match the array performance to the types of data files anticipated by the manufacturer or user. If the data unit size is increased, for example to several sectors rather than a bit or a byte, then data files smaller than a defined characteristic transition length may be stored in a single DASD and can be accessed independently. Conversely, larger files may be interleaved and stored in stripes across all the data DASDs.

European patent specification 0 369 707 published May 23, 1990 discloses static allocation of DASDs in an array in order to tailor the performance to anticipated system requirements. Different combinations are possible, ranging from system addressing of separate DASDs to the use of a single logical address space. Pending U.S. patent application Ser. No. 528,999 filed May 24, 1990 discloses a DASD array where the effect of transition length M on performance is recognized. There, one or more values of transition length M are fixed by the procedure of formatting the disks of the DASDs.

Systems of this type suffer from the compromise between efficiency for small and large files. In these known systems, characteristic transition length, also called interleave depth, is a data file length at the boundary between successive physical address writes and disk interleaved or striped writes. The compromise is made when the characteristic transition length is chosen for the system. Selection of a given relatively long characteristic transition length requires that some files cannot be stored in an interleaved manner, even though interleaved or striped storage may be the most efficient. But conversely, reducing the fixed system characteristic transition length has the result that certain files that might most efficiently be stored on one DASD are instead interleaved and stored on all of the data DASDs. In addition, sectors or data blocks are wasted by mismatches between file size and the indivisible size of the minimum interleaved data stripe. The inability of the host system to directly use the physical addresses of the array DASDs causes a loss of flexibility.

SUMMARY OF THE INVENTION

A principal object of the present invention is to provide a method and apparatus for storing data files in a DASD array wherein both relatively long and relatively short data files are handled efficiently. Other objects are to provide a method and apparatus in which the disadvantages of a system fixed characteristic transition length are avoided; to provide a method and apparatus in which flexibility of choice among data storage techniques is increased and to provide a method and apparatus that overcomes the necessity for compromises as well as problems encountered with methods used in the past.

In brief, the above and other objects and advantages of the invention are achieved by providing a method for storing data files in a data processing system having a storage array including a number of data DASD's each having physical addresses of locations where data is written and read. Data files to be stored are separated into two different classes depending upon at least the criterion of file length. Data files from the class of relatively shorter files are written at addresses upon one of the number of DASD's. Data files from the class of relatively longer data files are subdivided into a number of portions equal to the number of data DASD's. For each data file from the class of relatively longer files a file specific interleave depth is defined uniform across all the data DASDs by assigning a stripe of matching physical addresses on each data DASD, the physical addresses of each data DASD being sufficient to receive one of the subdivided portions. The subdivided portions are written to the stripe of matching physical addresses.

In brief, a data file storage apparatus in accordance with the present invention includes an array of X data storage DASD devices, where X is a positive integer greater than one. Means is provided for allocating a stripe of M matching data block addresses on each of the X DASD devices to a data file, where M is a positive integer number of data block addresses. Means is provided for dynamically varying the value of M.

BRIEF DESCRIPTION OF THE DRAWINGS

The invention and the above and other objects and advantages may best be understood from the following detailed description of the embodiment of the invention shown in the accompanying drawings, wherein:

FIG. 4 is a flow chart showing steps of a write command processing routine incorporating features of the present invention; and FIG. 5 is a diagram showing how data is written to a DASD array in accordance with the present invention.

DETAILED DESCRIPTION OF THE INVENTION

Figure 1:
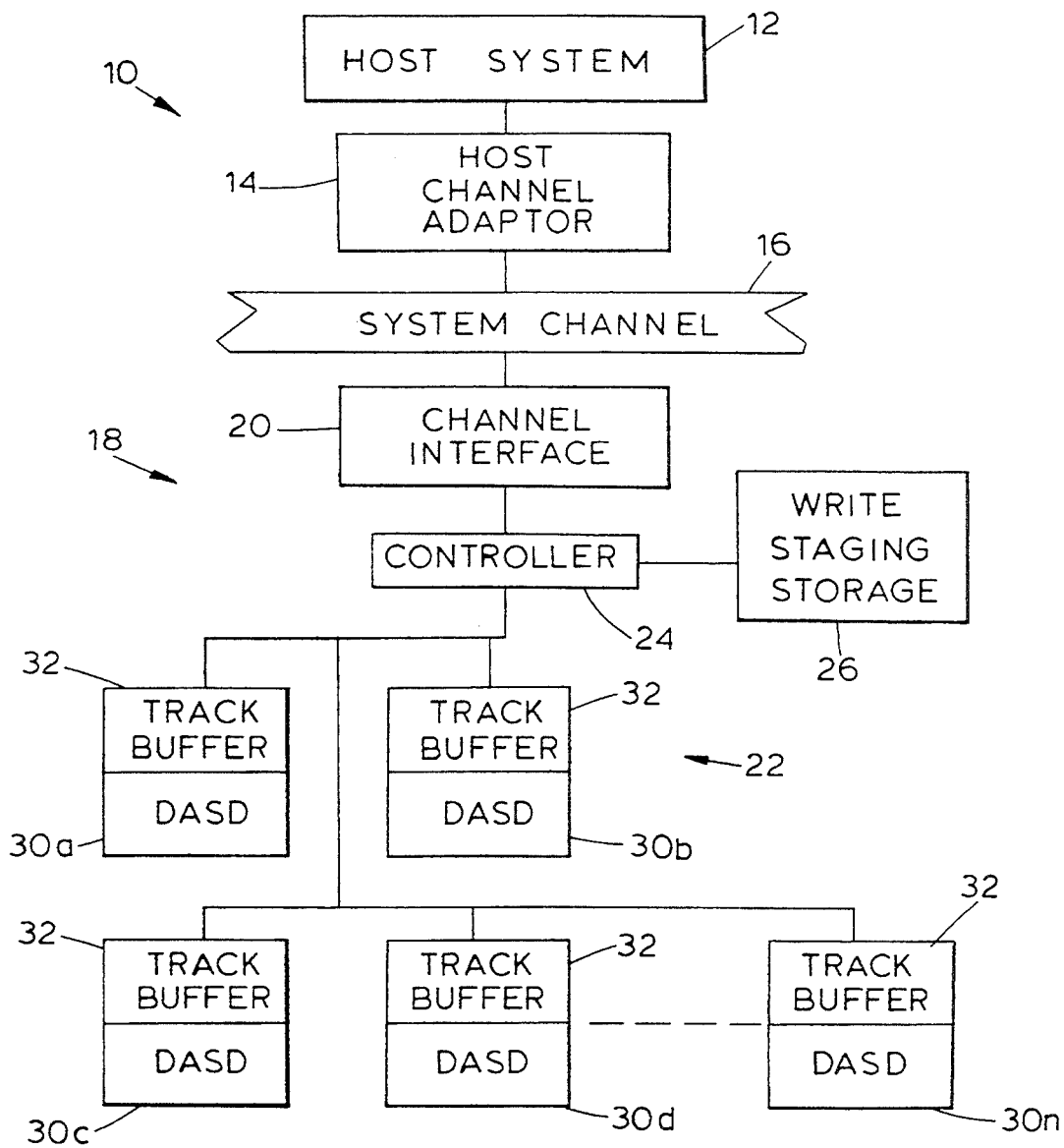
FIG. 1 is a schematic block diagram showing elements of a data processing system including a DASD array in accordance with the present invention.

Referring now to the drawings, in FIG. 1 there are illustrated portions of a data processing system generally designated as 10 embodying the present invention and in which the data storage method of the present invention may be carried out. The data processing system 10 includes a host or user system 12 that incorporates a central processing unit (CPU) and memory. A host channel adaptor 14 permits communication to and from the system 12 through a high speed system channel or bus 16. A data storage system 18 is coupled to the channel 16 through a channel interface 20. Other input/output devices such as printers, keyboards, displays and the like may also communicate with the host system 12 through the system channel 16.

The data storage system 18 serves to store data received from or under the control of the host system 12 and in the preferred embodiment of the invention is an outboard system having redundant data storage functions performed without supervision from the host system 12. Accordingly, the data storage system includes an array 22 of direct access storage devices (DASD's) controlled by an intelligent controller 24 equipped with a write staging storage area 26. When data is to be stored in the data storage system 18, a write command including data to be stored together with data block address information is sent from the host system through the channel 16. Conversely, when the host system 12 requires data from the storage system 18, a read command containing data block address information is communicated to the system 18 through the channel 16.

Figure 2:
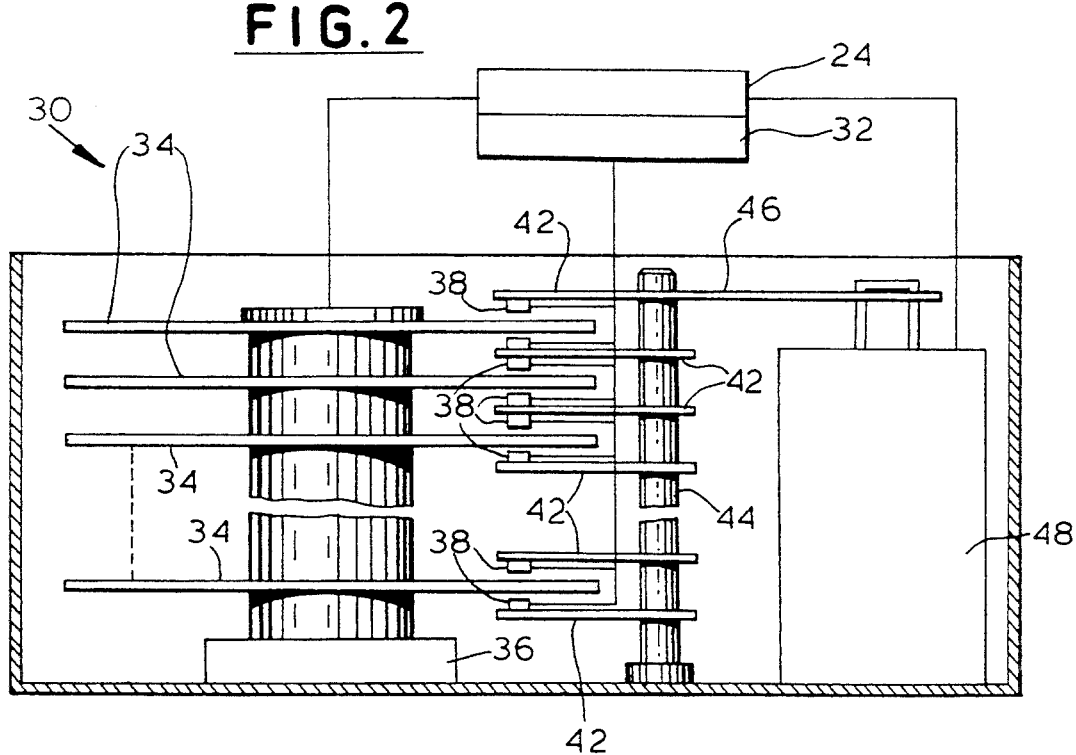
FIG. 2 is a schematic and block diagram of a magnetic disk unit forming one of the DASDs of the array.

As indicated diagrammatically in FIG. 1, the DASD array 22 includes a number "n" of DASD's 30a through 30n, where n is a positive integer greater than two. In the presently preferred embodiment of this invention, the DASDs 30a–30n are magnetic disk units, each provided with a full track buffer 32. One magnetic disk unit 30 is shown in simplified and schematic form in FIGS. 2 and 3.

Unit 30 includes a stack of disks 34 each having surfaces carrying magnetically active material. Disks 34 are mounted for simultaneous rotation around a common axis by an integrated spindle and motor assembly 36. Data is written to and read from the disk surfaces by magnetic read/write heads 38 that move across the disk surfaces. Heads 38 are mounted on flexure springs 40 carried by arms 42 ganged together for simultaneous pivotal movement about a support spindle 44. One arm 42 includes an extension 46 driven in pivotal motion by a head drive motor 48.

Figure 3:
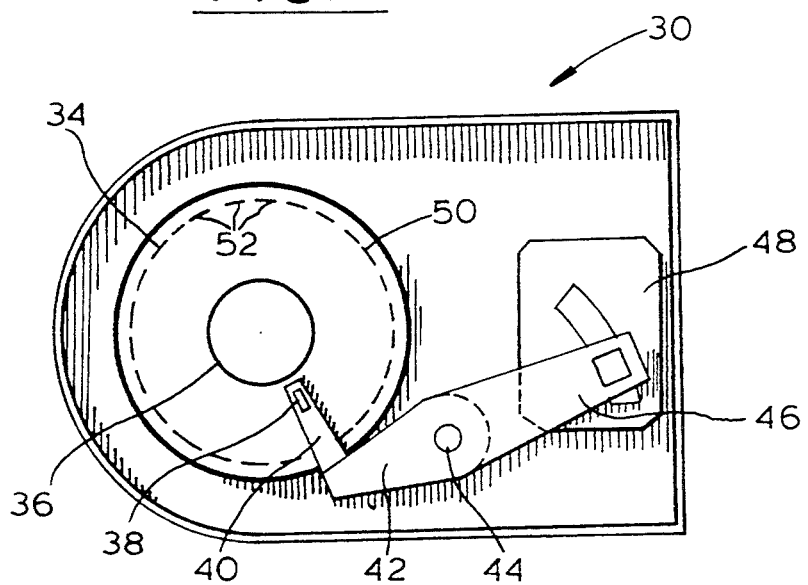
FIG. 3 is simplified top view of the magnetic disk unit of FIG. 2.

Each magnetic surface of each disk 34 is formatted to include numerous concentric circular tracks 50, one of which is indicated by a sectored line in FIG. 3. Each track includes numerous sectors 52. Blocks of data are written to and read from the sectors 52 by heads 38. Each block of data has a unique physical data block address within the unit 30. In response to control signals received from the controller 24, the heads 38 are moved into alignment with the track 50 containing the desired data block address and the reading or writing operation is performed as the target sectors spin under the head. In one DASD array 22 with which the invention may be used, seven data DASDs and one dedicated checksum DASD are included. Each identical DASD includes eight platters or disks, with fifteen surfaces used for data storage and one surface used for servo position control information. Each data surface includes two thousand tracks, each with from thirty to sixty 520 byte sectors, each sector having a unique data block address. The 520 byte sectors may include 512 bytes of file data.

In the presently preferred embodiment of the present invention, write commands received from the host system 12 through the channel 16 as well as checksum data calculated in the controller 24 using the write commands are placed in the write staging storage 26 by the controller 24 operating in parallel with the CPU of the host system 12. Controller 24 may acknowledge execution of write commands as they are staged. Data with contiguous addresses are blocked into single write commands. Staged write commands are queued in the order of physical addresses to be written in sweeps of heads 38 over surfaces of disks 34. Data staged for writing may be read in response to read commands without a physical disk read operation, and staged write commands are preempted by new write commands having the same address. Further information about these functions of the data storage system 18 including controller 24 and write staging storage 26 may be found in U.S. patent application Ser. No. 648,944 filed Feb. 1, 1991, incorporated by reference herein.

The method and apparatus of the present invention makes efficient use of the DASD array 22 for both relatively large and relatively small files by dynamically varying the characteristic transition length "m" so that the interleave depth is coordinated with data file length or type. "m" is a positive integer that establishes the width of a stripe of DBAs into which a file is interleaved, and is equal to one or more DBAs or segments of data. For the smallest interleaved files a value of 1 is dynamically assigned to m. For larger files, larger values of m are assigned to optimize the efficiency of the file storage operations.

More specifically, in the preferred embodiment of the invention, there is provided a write command processor routine 60 performed by the host system 12 and seen in the flow chart of FIG. 4. Alternatively, the write commands may be processed by performing all or part of the routine 60 in the array controller 24. When the routine is performed within the host system 12, information about the array 22 including the number and address size of data DASDs is provided to the system 12.

When a data file is to be stored in the data storage system 18 by the host system 12, the file is received by the write command processor 60 as seen in block 62. In block 64, the data file is compared with a threshold data file size. The threshold data size is determined for the data storage system 18 in order to maximize file storage efficiency taking into account such factors as DASD access times, data transfer rates and the like. For example, with an array 22 of "x" data DASD's ("x" is a positive integer larger than one and is equal to n−1 where one dedicated checksum DASD is used) each having data block sizes of 512 data bytes per block, an efficient data threshold might be (n−2)×512 or (n−1)×512. The goal is to select a threshold value consistent with the system parameters such that the overall file storage time delays are minimized.

If the data file is larger than the threshold, in accordance with the present invention it is stored in the array 22 in a striped or disk interleaved fashion. In block 66, a determination is made as to whether or not the file can be equally subdivided into a number of portions equal to the number of data DASDs. In the illustrated embodiment, n−1 equal portions of equal size are needed. If not, in block 68 the file is padded by adding non-file bytes to increase the data file size. Then in block 70 the data file is subdivided into n−1 of portions of equal size.

If the comparison in block 64 detects a data file size smaller than the threshold, then an additional determination is made in block 72 relating to a characteristic of the data file other than size. This step recognizes the fact that file storage efficiencies may be affected by file characteristics other than size alone. If a file is of a type that is not likely to be revised in the future when read from storage, then it can be more efficient to store the file in interleaved fashion even though it is smaller than the threshold. An example is an image file that typically is read but not revised and written again. Files of this non-revise type can be identified by header, file structure or name or the like and detected in block 72. These files are processed in blocks 66–70 in the manner described above in the same way as longer files. Other file characteristics or array or system characteristics may be used to classify files, or, alternatively, the file classification may be based on size alone by omitting block 72 of routine 60.

Those files that are smaller than the threshold size and are not of the non-revise type are most efficiently stored in contiguous addresses on one DASD 30 of the array 22. For example, these files are likely to be of a transactional nature that are to be read, revised and overwritten with a coupled read-write operation upon subsequent access. For small files stored on single DASDs, simultaneous reads and writes can be carried out in parallel by the heads 38. In block 74, one or more contiguous DBAs are assigned to the data file. In block 76, a single write command including the data file and the DBA information is sent by way of the channel 16 to the data storage system 18.

Files that are to be stored in an interleaved fashion are processed differently. In accordance with the invention, a characteristic transition length or interleave depth m is determined in block 78 for each file. The interleave depth m is the width of the stripe of DBAs to which the data file is written. For a file having a size or padded size equal to n−1 data blocks or sectors, the interleave depth is one DBA or sector wide. For example, with four data DASDs (x=1), a data file with a size of 2048 bytes is divided into four 512 byte data blocks and stored in four interleaved data blocks. In this case the characteristic transition length m is one DBA or sector or 512 bytes. But a different value is used for other files. For example, a 32,768 byte file is divided into four 8192 byte portions, each of which is written to sixteen DBAs. In this case, a characteristic transition length m of sixteen DBAs is used.

In block 80, DBAs are acquired for each of the data file portions. To permit parallel writing to all of the DASDs, the portions are assigned to corresponding or matching DBAs of each of the DASDs. For each portion, contiguous DBAs are used when the interleave depth is wider than one DBA so that write commands can be executed in blocks as the heads 30 sweep the surfaces of disks 30. It is preferred that the disk rotations within the array 22 are synchronized for maximum data transfer rates. As seen in block 82, write commands including the data portions and the DBA information are sent by way of the channel 16 to the data storage system 18.

Table 1 illustrates how the write commands sent from the write command processor 60 are carried out within the array 22. The table refers to an array of n DASDs 30a through 30n, each having physical data block addresses (DBAs) from 1 through v. DASDs 30a through 30n−1 are data DASDs, and DASD 30n is the dedicated checksum DASD.

TABLE 1

| DBA | DASD 30a | DASD 30b | DASD 30c | DASD 30i | DASD 30n-1 | DASD 30n |
|---|---|---|---|---|---|---|
| 1 | R-W | . | . | . | . | XR-W |
| 2 | . | . | . | . | . | . |
| 3 | . | . | . | . | . | . |
| 4 | . | . | . | . | . | . |
| 5 | R-W | . | . | . | . | XR-W |
| 6 | R-W | . | . | . | . | XR-W |
| . | . | . | . | . | . | . |
| s | W | W | W | W | W | WX |
| . | . | . | . | . | . | . |
| t | W | W | W | W | W | WX |
| t + 1 | W | W | W | W | W | WX |
| t + 2 | W | W | W | W | W | WX |
| t + 3 | W | W | W | W | W | WX |
| . | . | . | . | . | . | . |
| . | . | . | . | . | R-W | XR-W |
| . | . | . | . | . | R-W | XR-W |
| v-2 | . | . | . | . | . | . |
| v-1 | . | R-W | . | . | . | XR-W |
| v | . | . | . | . | . | . |

At DBA 1 of DASD 30a in Table 1 there is noted an example of a coupled read-write operation indicated by the notation R-W. Here data is read, revised in the host system 12, and overwritten. At the same DBA 1 in the checksum DASD n the checksum information is updated as indicated by the notation XR-W. In the manner described in more detail in U.S. patent application Ser. No. 648,944 filed Feb. 1, 1991, incorporated by reference herein, the checksum data is updated by reading the prior checksum data, XORing that with the new data and then writing the new checksum data. Similar coupled read-write operations with checksum updating are seen elsewhere in Table 1, for example at DBA v−1 of DASD 30b and DASD 30n.

In DASD 30a, a data file having a size requiring two DBAs is located at contiguous DBAs 5 and 6. This file is indicated to be the subject of a coupled read-write operation R-W and corresponding checksum update XR-W at the matching DBAs of checksum DASD 30n.

An interleaved write is seen in table 1 at DBA s. n−1 equal size portions of the file are written to DBA s of DASDs 30a through 30n−1 as indicated by the notation W. Checksum data is calculated for DBA s of the checksum DASD 30n by XORing the data written to the data DASDs. Because the data file fits in a stripe that is one DBA wide, the characteristic transition length dynamically allocated to this file is m=1. In other words, the data file is stored in a stripe across the data DASDs, and the stripe has a width of one DBA or sector. Write performance is enhanced because it is not necessary to read the preexisting checksum data from DBA s of DASD 30n in order to update it. The new checksum data is calculated directly from the new written data and is simply overwritten at the corresponding DBA of DASD 30n.

A larger data file is stored at DBAs t through t+3. As with the file stored at DBA s, this file is divided into equal size portions equal in number to the number of data DASDs. But because the file is larger, a larger characteristic transition length or interleave depth is used with this file. The characteristic transition length m=4 is dynamically allocated, and the file is stored in a wider stripe having a width of four DBAs or sectors. Each portion of the file is stored in contiguous DBAs. Preferably, the order of data of the data file is maintained, with the first four contiguous data locks in the original order written to sequential addresses of DASD 30a, the next four contiguous data blocks in the original order written to sequential addresses of DASD 30b and so forth. The corresponding DBAs of the checksum DASD are provided with the XOR of the data written at the data DASDs as indicated by the WX notation. Performance is enhanced because the preexisting checksum data need not be read.

FIG. 5 is a diagram showing a simplified DASD array including DASD's 30a through 30n represented by vertical columns, each having four disk surfaces 34a through 34d. 84a is a small file having a length of a single sector written on disk 34a of DASD 30a, and 84n is the updated checksum written at the same physical address on DASD 30n as part of a coupled read-write operation. Similarly, 86c is a somewhat longer data file written at disk 34a of DASD 30c, and 86n is the corresponding updated checksum data on DASD 30n. The writing of relatively small files and updated checksum data on disks 34b is indicated at 88d, 88n, 90b and 90n. Each file 86–90 is written to one sector or to consecutive sectors of a single DASD.

A relatively longer file 92 is interleaved across disks 34d of the array rather than being written to a single disk as are files 84–90. Equal portions of the file are written at 92a, 92b, 92c and 92d and the checksum of the written data is written at 92n of disk 34d of the checksum DASD 30n. 94a–94d are larger equal segments of a somewhat larger file on disks 34e, and 94n is the checksum data on DASD 30n. The characteristic transition length dynamically allocated for the file 94 is a few times larger than the characteristic transition length dynamically allocated for the file 92. By varying the characteristic transition length, the files 92 and 94, although having different total size, each fit neatly and without waste onto the array 22.

Widely varying characteristic transition lengths can be allocated to different files. File 96 is an example of a large file that is stored on disks 34c, 34d and 34a of the array. File 96 is divided into n−1 equal size portions, and each equal portion requires numerous DBAs. In the illustrated example of file 96, the file requires all of the sectors in a stripe across the DASDs that is three tracks wide. Assuming for example that there are fifty sectors per track, the characteristic transition length m=3×50=150 is dynamically allocated for most efficient storage of this file. This is an efficient way to store a large file of this type, but if the characteristic transition length of the entire array were fixed at such a large value, shorter files would not be handled efficiently in terms of either time or storage space.

The specific way that the large file 96 is arrayed onto tracks in the DASD array depends upon the relationship between the sequence of the DBAs and the physical positions of the DBAs within the DASDs. In the preferred arrangement, sequential addresses are given to all of the sectors in a first track of a cylinder. Then, in order to reduce read/write head motion, the following sequential addresses are given to the segments in a next track in the same cylinder. Following the sequential addresses in all of the tracks of a first cylinder, the addresses continue sequentially with segments of a next cylinder to which the read/write head is moved. This arrangement is preferred because sequential DBAs equal to two entire cylinders can be addressed with only a single head motion by simply switching between heads.

This addressing system results in the way that file 96 is arrayed in FIG. 5. The first third of the stripe containing file 96 is interleaved onto sequential and matching DBAs in complete tracks of disks 34c as indicated by 96ac, 96bc, 96cc and 96dc. The checksum of this data is written at 96nc. The second third of the stripe containing file 96 is interleaved onto the next sequential addresses in the same cylinder upon disks 34d of the array as indicated by 96ad, 96bd, 96cd and 96dd, and the checksum of this data is written at 96nc. The DBAs occupied by tracks 96ad, 96bd, 96cd and 96dd are the final DBAs in this cylinder.

The final third of the stripe containing file 96 is interleaved onto disks 34a of the array in the next sequential DBAs as indicated by 96ad, 96bd, 96cd and 96dd, and the checksum of this data is written at 96nc. The DBAs containing tracks 96ad, 96bd, 96cd and 96dd are the first consecutive DBAs of the next sequential cylinder.

Data is stored in the array seen in FIG. 5 without changing the order of data in the data files. A data file can be considered to be a stream of data bits having a given order from the start of the file to the end of the file. Using file 94 as an example, the file, after padding if necessary, is divided into x or n−1 equal portions for storage in the DASD array. The first portion of the file data stream is stored in the original order at consecutive DBAs 94a of DASD 30a and the second portion including the following segment of the data stream is stored in the original order at consecutive DBAs 94b. This pattern continues, with the entire file 94 being stored in segments each retaining the original data stream order. This is true for all interleaved files because the characteristic transition length m is dynamically selected to match the file size and accept equal size parts of the file in the original data order in blocks at matching addresses of the data DASDs.

It is not required that certain disks be used only for interleaved storage and other disks be used only for single disk per file storage. 98b is the location of a relatively small file and 98n is the corresponding updated checksum data. This file shares disk 34d of DASD 30b with striped file portions 92b, 94b and 96bd. However, it is preferred to reserve contiguous blocks of DBAs for interleaved storage, and not to use the reserved addresses for storage of relatively short files on single disks. Depending on factors such as array size, anticipated storage requirements or past experience, the optimum address reservation approach may be to reserve certain adjacent cylinders on all disks for stripes of interleaved data. For example tracks numbered 0 through 999 of all DASDs may be reserved for interleaved files and only tracks 1000 through 1999 of all DASDs may be used for storage of non-interleaved files. Alternatively, it would be possible to reserve entire disks or disk surfaces for interleaved file storage and to prohibit operations such as that represented by 98b and 98n.

Because relatively small files and files subjected to coupled read-write operations are stored at one DBA or contiguous DBAs and typically on a single data DASD, writes and reads require only one data DASD head 38 and the checksum DASD head 38. Reads and writes can be made simultaneously to files of this type on different data DASDs by different heads 38. Preferably, as described in more detail in U.S. patent application Ser. No. 648,944 filed Feb. 1, 1991, incorporated by reference herein, the controller 24 sequences the data reads and writes in an optimum order dictated by queued writes to the checksum DASD 30n, with other operations being performed as the arms 32 of all of the DASDs sweep the disks 30 in unison. This permits efficient reads and writes of the class of relatively small data files.

Because of the flexibility provided by the present invention, larger files and files that are not subject to coupled read-writes are also handled efficiently. These files are written in stripes interleaved into the same DBAs upon all the data DASDs. Because the characteristic transition length is dynamically adjusted in accordance with file size, it is possible for the write processing routine to divide files of many different sizes into equal size portions equal in number to the number of data DASDs. Every file in the class of larger files can be written to a stripe made up of one or contiguous DBAs on all of the data DASDs. All writes of such files are channelled in parallel to all of the DASD heads 38 writing in unison and consistently high data transfer rates can be maintained. Moreover, because interleave depth can be tailored to file size, wasted data storage space is minimized.

While the invention has been described with reference to details of the embodiment of the invention illustrated in the drawings, these details are not intended to limit the scope of the invention as set forth in the appended claims.

I claim:

1. A method for storing data files in a data processing system having a storage array including a number of data DASD's each having locations designated by physical addresses where data is written and read, said method comprising the steps of:
   (a) separating data files to be stored into two different classes depending upon at least the criterion of file length;
   (b) writing data files from the class of relatively shorter files at addresses upon one of the number of DASD's; and (c) storing data files from the class of relatively longer data files by:
  (1) subdividing each and every data file from the class of relatively longer files into a number of portions equal to the entire number of data DASD's;
  (2) defining for each data file from the class of relatively longer files a file specific interleave depth uniform across all the data DASDs by assigning a stripe of locations having matching physical addresses on each data DASD, the location designated by the physical address of each data DASD being sufficient to receive one of the subdivided portions; and
  (3) writing the subdivided portions to the stripe of locations having matching physical addresses.

2. A method as claimed in claim wherein the operation of the data DASDS is synchronized and said step of writing the subdivided portions to the stripe of locations having matching physical addresses is performed by writing all of said portions simultaneously.

3. A method as claimed in claim 1 wherein said subdividing step includes splitting the data file into a number of data blocks equal to an integer multiplied by the number of data DASDs.

4. A method as claimed in claim 1 wherein said separating step includes use of at least one additional criterion relating to the expected future use of the file.

5. A method as claimed in claim 1 further comprising reserving a supply of physical addresses in the storage array for use exclusively for storage of data files from the class of relatively longer data files, and said defining step includes assigning addresses from the reserved supply.

6. A method as claimed in claim 5 wherein said reserving step includes dedicating groups of sequential physical addresses in each DASD to the reserved supply.

7. A method as claimed in claim 1 further including maintaining for each file checksum data in a location different from the data DASDs where that file is written.

8. A method as claimed in claim 7 wherein said different location is a dedicated checksum DASD.

9. A method as claimed in claim 7 wherein said step of maintaining checksum data for the class of relatively shorter files is performed by reading prior checksum data, calculating new checksum data from the data file being written and from the existing checksum data, and overwriting existing checksum data with new checksum data.

10. A method as claimed in claim 7 wherein said step of maintaining checksum data for the class of relatively longer files is performed by calculating new checksum data from the data file being written and overwriting existing checksum data with new checksum data.

11. A method as claimed in claim 1 wherein said subdividing step includes forming portions each having a single data block address.

12. A method as claimed in claim 1 wherein said subdividing step includes forming portions each having an equal number of more than one data block addresses.

13. A method as claimed in claim 1 wherein said subdividing step includes retaining in each subdivided portion a single sequence of data having the same order as data in the data file.

* * * * *